Patented Mar. 2, 1937

2,072,770

UNITED STATES PATENT OFFICE

2,072,770

COATING COMPOSITION AND DRIER THEREFOR

Ebenezer E. Reid, Baltimore, Md., assignor to E. I. du Pont de Nemours & Company, Wilmington, Del., a corporation of Delaware No Drawing. Application October 4, 1934, Serial No. 746,775

13 Claims. (Cl. 134—57)

This invention relates to organic plastic compositions, and more particularly to organic plastic compositions comprising metal salts of certain phthalamic acids.

This invention has as an object the provision of organic plastic compositions having new and desirable properties. A further object is the provision of compositions comprising organic plastic substances and novel driers. A still further object is the provision of compositions comprising an organic plastic substance and novel materials for the retardation of the destructive effect of light rays on the plastic substance. Other objects will appear hereinafter.

These objects are accomplished by the following invention wherein a phthalamic acid in which at least one amino hydrogen is substituted by the radical of an organic hydroxyl compound, or an ester or metal salt thereof, is incorporated with an organic plastic substance to form new combinations of matter.

The mono- or di-alkyl, aryl, aralkyl, or the mixed alkyl-aryl, etc. phthalamic acids may be prepared by reacting phthalic anhydride with the proper primary or secondary amine, as represented by the following equation in which dibutylamine is used as an example:

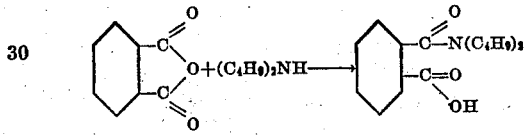

When the phthalic anhydride is added to the amine, reaction takes place immediately and heat is evolved. For this reason it is advisable to add the phthalic anhydride at such a rate that the temperature does not rise beyond 100° C. The reaction should be carried out in a vessel equipped with a return condenser, except when high boiling amines are used, in which case an open vessel is satisfactory. The reaction mass should eventually be heated to about 100° C. for ¼ to ½ hour to insure completion of the reaction. On cooling, the mass solidifies to a white crystalline solid, which can be purified if desired by recrystallizing from alcohol.

In addition to the amines specifically disclosed in the example given below, I may use any amine of the general formulae:

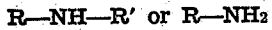

wherein R and R' are alkyl, aryl, cycloalkyl or aralkyl groups.

In order to prepare the metal salts of the disubstituted phthalamic acids, which are in general insoluble in water, it is first desirable to prepare a water soluble salt, usually the sodium salt. This is conveniently done by adding slightly less than the calculated amount of a 10–20% solution of sodium hydroxide, and finally titrating to alkalinity to phenolphthalein. A layer of toluene is added to the sodium salt solution thus obtained. One equivalent of a water solution of the metal salt is then added with vigorous stirring. The metal salts of the substituted phthalamic acids, which are in general water insoluble, are dissolved in the toluene as fast as formed. Sufficient toluene should be used to give about a 10% solution of the metal salt. Solutions of this concentration are heavier than the aqueous phase and consequently form the bottom layer, which may be separated, washed with water, dried over magnesium sulfate, filtered, and evaporated.

Having outlined above the general method for the preparation of the substituted phthalamic acids and their salts, the following specific examples are added for purposes of illustration but not in limitation:

EXAMPLE 1.—N-DIBUTYLPHTHALAMIC ACID

This acid was prepared by adding one mol. of phthalic anhydride to one mol. of dibutylamine contained in a flask provided with a reflux condenser. The mass was stirred during the addition and after the initial heating of the reaction had abated, heat was applied to the reaction mass and the material heated at 100° C. for 15 minutes. The product was dissolved in the equivalent amount of sodium hydroxide, toluene added, and a lead salt added to the solution. The lead salt formed dissolved in the toluene which, because of the weight of the solution, became the lower layer, which was separated, washed with water, dried, filtered, and concentrated.

EXAMPLE 2.—N-DIHEXYLPHTHALAMIC ACID

N-dihexylphthalamic acid was prepared by reacting one mol. of dihexylamine with one mol. of phthalic anhydride using a reflux condenser to prevent loss of dihexylamine by evaporation. The mass was well stirred during the reaction. Heat was evolved during the reaction and sufficient heat was finally applied to raise the temperature to 100° C. for 15 minutes. The product was a liquid which became solid on cooling. It was insoluble in water but soluble in alcohol and most other organic solvents. It was purified by recrystallization from alcohol.

EXAMPLE 3.—N-DICYCLOHEXYLPHTHALAMIC ACID

This material was prepared by reacting one mol. of dicyclohexylamine with one mol. of phthalic anhydride with a reflux condenser and stirring. Heat was evolved and the mass was finally heated to 100° C. for 15 minutes to insure completion of the reaction. The final product was a solid when cold and was purified by recrystallizing from alcohol.

EXAMPLE 4.—N-DITOLYLPHTHALAMIC ACID

This acid was prepared by reacting one mol. of ditolylamine with one mol. of phthalic anhydride. The reaction liberated heat. The reaction mass was finally heated to 100° C. for 15 minutes to insure completion of the reaction. The final product was a crystalline solid which was purified by recrystallizing from alcohol.

EXAMPLE 5.—N-ETHYLPHENYLPHTHALAMIC ACID

This acid was readily prepared by reacting one mol. of ethylphenylamine with one mol. of phthalic anhydride. The reaction proceeded smoothly with liberation of heat and the product was purified by recrystallizing from alcohol.

EXAMPLE 6.—N-ETHYLCYCLOHEXYLPHTHALAMIC ACID

This acid was prepared by reacting ethylcyclohexylamine with phthalic anhydride.

EXAMPLE 7.—N-CYCLOHEXYLPHTHALAMIC ACID

This acid was prepared by reacting cyclohexylamine with phthalic anhydride.

The acids, the preparation of which is described above, are soluble in sodium hydroxide solution. Their metal salts were prepared by adding a solution of the appropriate metal salt to the solution of the sodium salt of the acid. Thus, to prepare cobalt N-dibenzylphthalamate a solution of 130 g. of cobaltous chloride in 260 g. of water was added to a solution containing 365 g. of the sodium salt of N-dibenzylphthalamic acid in 3 liters of water. The cobalt salt precipitated out as a solid as fast as formed and a nearly quantitative yield was obtained. The cobalt N-dibenzylphthalamate was dissolved in toluene, dried with anhydrous magnesium sulfate, and recovered by evaporating the toluene.

Manganese N-ditolylphthalamate was prepared similarly, substituting manganese chloride for cobaltous chloride and N-ditolylphthalamic acid for N-dibenzylphthalamic acid.

The metal salts of the substituted phthalamic acids are useful in compositions comprising organic plastic substances. Thus, the cobalt, manganese, lead, iron, and cerium salts are useful in paints and varnishes as metal driers.

The cerium, iron, titanium and copper salts of these phthalamic acids absorb ultraviolet rays and protect coating composition films, for example, nitrocellulose, from deterioration by long exposure to direct sunlight. This is particularly advantageous in connection with unpigmented nitrocellulose films. When the phthalamic acid salts of these metals are present in such films in proportion to reduce the ultraviolet light transmission by 25% or more the life of the film when exposed to direct sunlight is greatly increased.

The mercury, copper, and cerium salts are good fungicides and good mildew inhibitors for fabrics and paper.

The mercury, copper and zinc salts are useful as wood preservatives. For this purpose the wood may be impregnated with a solution of the salt in an aromatic hydrocarbon, or the wood may be first impregnated with a water solution of a soluble salt of the phthalamic acid and then treated with an appropriate aqueous solution of a salt of the metal or vice versa.

The esters and salts of the substituted phthalamic acids and their hydrogenated derivatives such as the esters of the ortho-dialkyl or diaryl aminomethylbenzoic acid are useful as acid acceptors in such compositions as explosives and nitrocellulose coating compositions.

Sulfonated derivatives of the substituted phthalamic acids in the form of their sodium salts are useful as wetting agents, for example, N-dibutylsulphophthalamic acid.

The free acids, such as N-dibutylphthalamic acid, can be used as plasticizers and the free acids are also useful in coating compositions.

The esters of the phthalamic acids above disclosed, and similar phthalamic acids may be used as softeners or plasticizers for resins, cellulose derivatives, and the like. Thus, the butyl ester of N-dibutylphhalamic acid may be used as a softener for polyhydric alcohol-polybasic acid and other resins, and for cellulose derivatives.

Perhaps the most important use of the compounds of the present invention is the use of the metal salts as driers. The following examples show coating compositions containing metal salts of the phthalamic acids of the present invention wherein these salts are useful either as driers or as protective agents against the action of ultraviolet light.

EXAMPLE 8.—VARNISH LACQUER

A. *Formula for varnish solution*

| | | |
|---|---|---|
| Ester gum | lbs | 100 |
| China-wood oil | gals | 15 |
| Lead N-dibutylphthalamate | lbs | 4.4 |
| Manganese N-dibutylphthalamate | lbs | 1.7 |
| Toluol | gals | 20 |

Fifty pounds of ester gum and 15 gallons of China-wood oil were heated in a kettle to 525° F., removed from the fire, the balance of the ester gum added, and the mixture cooled to 350° F. and then thinned with toluol. The lead N-dibutylphthalamate and manganese N-dibutylphthalamate dissolved in toluol were added.

B. *Cellulose nitrate solution*

| | | |
|---|---|---|
| Dry ½ sec. cellulose nitrate | lbs | 2 |
| Butyl acetate | gal | ½ |
| Butyl alcohol | gal | ½ |

One volume of varnish solution (A) is mixed with an equal volume of cellulose nitrate solution (B). This product may be sprayed on as prepared, or it may be thinned slightly with toluol, butanol, or butyl acetate for easy brushing.

The lead and manganese N-dibutylphthalamates used in this varnish act as metal driers and also serve to protect the varnish film from ultraviolet light.

This lacquer dries to the touch in 15 minutes, hard enough to handle in two hours, very hard in one day, and extremely hard and tough in two to three days.

Example 9.—Ester Gum Lacquer

| | Pounds |
|---|---|
| Ferric N-ditolylphthalamate | 4 |
| Dry ½ sec. cellulose nitrate | 75 |
| Ester gum | 41 |
| Diamyl or dibutylphthalate | 47 |
| Butyl acetate | 15 |
| Ethyl acetate 85% | 35 |
| Xylol | 20 |

The ferric N-ditolylphthalamate in the above formula serves to protect the lacquer film from ultraviolet light.

Example 10.—Black Baking Enamel

| | Parts |
|---|---|
| Gilsonite | 200 |
| Resin* | 240 |
| Kerosene | 270 |
| Hi-flash naphtha | 90 |
| Drier** | 12 |

To make this enamel the gilsonite was heated to around 600° F., cooled to 575° F. and the resin, previously heated to 250° F., added. The kerosene and Hi-flash naphtha (an aromatic hydrocarbon solvent mixture boiling from 145 to 210° C. and having a specific gravity within the range 0.856 to 0.881 at 25° C.) were mixed and added to the asphalt resin mixture. The drier was added after the enamel had cooled.

*The resin was prepared from the following materials:

| | Parts |
|---|---|
| Glycerin | 58 |
| Sodium hydroxide | 12 |
| Linseed oil | 560 |
| Rosin | 78 |
| Phthalic anhydride | 124 |

To make this resin the sodium hydroxide was dissolved in a small amount of water and stirred into the glycerin. The linseed oil was then added and the mass heated to 480° F. and held at that temperature until the reaction was complete. The rosin and phthalic anhydride were then added in the order named and the preparation completed by heating to 460° F. for 3 hours.

** The drier had the following composition:

| | Parts |
|---|---|
| Ferric N-dibutylphthalamate | 3.2 |
| Toluene | 28.8 |

The above enamel was applied to steel and baked for ½ hour at 450° F. over a bituminous enamel undercoat similarly baked. This enamel containing ferric N-dibutylphthalamate dried to a hard, tough, glossy film.

Example 11.—Fender Enamel for High Temperature Baking

| | Parts |
|---|---|
| Gilsonite | 450 |
| Wood rosin (grade F) | 50 |
| Lump burnt umber | 18 |
| Manganese drier* | 100 |
| Alkali refined linseed oil | 213 |
| Refined menhaden oil | 213 |
| Kerosene | 605 |
| V. M. & P. naphtha | 67 |
| Mineral spirits | 118 |

*The manganese drier has the following composition:

| | Parts |
|---|---|
| Manganese N-dicyclohexyl phthalamate | 10 |
| Toluene | 90 |

The mixed oils were heated with lump burnt umber (suspended in a wire basket) for 2 to 2½ hours at 600° F. The next day gilsonite and wood rosin were added and the temperature brought up to 600° F. The mixture was then cooled and reduced with thinner, then manganese drier added. If lower viscosity is required, additional kerosene may be used. The above enamel, over a suitable undercoat (e. g., "rubber first coat"), is baked ½ hour at 420° F.

In addition to their use in compositions comprising rosin, ester gum, China-wood oil, linseed oil, gilsonite, and polyhydric alcohol-polybasic acid type resins, the metal alkyl phthalamates may also be used in organic plastic compositions comprising other oils, asphalts, natural and synthetic resins, cellulose derivatives, waxes, etc. Specific examples of such materials include castor oil, soya bean oil, perilla oil, glance pitch, grahamite, petroleum asphalts, phenol-aldehyde resins, vinyl resins (e. g., vinyl acetate), methyl methacrylate, resinous condensates of polydric phenols with aliphatic polyhalide ("ether" resins); Congo resin, kauri resin, cellulose acetate, dodecyl cellulose, ethyl cellulose, Montan wax, paraffin wax, ozokerite, carnauba wax, etc.

The above description and specific examples are intended for illustration only. Any modification of or variation therefrom which conforms to the spirit of the invention is intended to be included within the scope of the claims.

I claim:

1. A coating composition comprising a drying oil, a resin, and, as a drier, a polyvalent, water-insoluble metal salt of a phthalamic acid wherein at least one amino hydrogen is substituted by the radical derived from an organic hydroxyl compound by removal of the hydroxyl thereof, the metal of said polyvalent metal salt being present in the coating composition in the amounts usual to drier-containing coating compositions.

2. A coating composition comprising a drying oil, a resin, and, as a drier, a polyvalent, water-insoluble metal salt of a phthalamic acid wherein both amino hydrogens are substituted by radicals derived from organic hydroxyl compounds by removal of the hydroxyl thereof, the metal of said polyvalent metal salt being present in the coating composition in the amounts usual to drier-containing coating compositions.

3. A coating composition comprising a drying oil, a resin, and, as a drier, a polyvalent, water-insoluble metal salt of an alkylphthalamic acid, the metal of said polyvalent metal salt being present in the coating composition in the amounts usual to drier-containing coating compositions.

4. A coating composition comprising a drying oil, a resin, and, as a drier, a polyvalent, water-insoluble metal salt of a dialkylphthalamic acid, the metal of said polyvalent metal salt being present in the coating composition in the amounts usual to drier-containing coating compositions.

5. A coating composition comprising a drying oil, a resin, and a polyvalent, water-insoluble, metal salt of a phthalamic acid wherein at least one amino hydrogen is substituted by the radical derived from an organic hydroxyl compound by removal of the hydroxyl thereof, said metal being of the class consisting of cobalt, manganese, lead, iron, and cerium, the metal of said polyvalent metal salt being present in the coating composition in the amounts usual to drier-containing coating compositions.

6. A coating composition comprising a drying oil, a resin, and a polyvalent, water-insoluble, metal salt of a phthalamic acid wherein both amino hydrogens are substituted by radicals derived from organic hydroxyl compounds by removal of the hydroxyl thereof, said metal being of the class consisting of cobalt, manganese, lead, iron, and cerium, the metal of said polyvalent metal salt being present in the coating composition in the amounts usual to drier-containing coating compositions.

7. A coating composition comprising a drying oil, a resin, and a polyvalent, water-insoluble, metal salt of an alkylphthalamic acid, said metal being of the class consisting of cobalt, manganese, lead, iron, and cerium, the metal of said polyvalent metal salt being present in the coating composition in the amounts usual to drier-containing coating compositions.

8. A coating composition comprising a drying oil, a resin, and a polyvalent, water-insoluble, metal salt of a dialkylphthalamic acid, said metal being of the class consisting of cobalt, manganese, lead, iron, and cerium, the metal of said polyvalent metal salt being present in the coating composition in the amounts usual to drier-containing coating compositions.

9. A coating composition comprising a drying oil, a resin, and a lead salt of a dialkylphthalamic acid, the lead of said lead salt being present in the coating composition in the amounts usual to lead drier-containing coating compositions.

10. A coating composition comprising a drying oil, a resin, and a lead salt of dibutylphthalamic acid, the lead of said lead salt being present in the coating composition in the amounts usual to lead drier-containing coating compositions.

11. A drier for paints and varnishes in the form of a polyvalent water-insoluble, metal salt of a phthalamic acid wherein at least one amino hydrogen is substituted by the radical derived from an organic hydroxyl compound by removal of the hydroxyl thereof, said metal being of the class consisting of cobalt, manganese, lead, iron and cerium.

12. A coating composition which contains a drying oil and a polyvalent metal salt of a phthalamic acid wherein at least one amino hydrogen is substituted by the radical derived from an organic hydroxyl compound by removal of the hydroxyl thereof, said metal being of the class consisting of cobalt, manganese, lead, iron and cerium, the metal of said polyvalent metal salt being present in the coating composition in the amounts usual to drier-containing coating compositions.

13. A coating composition containing a polyvalent metal salt of a phthalamic acid wherein at least one amino hydrogen is substituted by the radical derived from an organic hydroxyl compound by removal of the hydroxyl thereof, said metal being of the class consisting of cobalt, manganese, lead, iron and cerium, the metal of said polyvalent metal salt being present in the coating composition in the amounts usual to drier-containing coating compositions.

EBENEZER E. REID.